United States Patent Office 3,310,518
Patented Mar. 21, 1967

---

3,310,518
PROCESS FOR PREPARING POLYMER
SOLUTIONS
Daniel Edwin Maloney, Wilmington, Del., assignor to
E. I. du Pont de Nemours and Company, Wilmington,
Del., a corporation of Delaware
No Drawing. Filed Mar. 27, 1964, Ser. No. 355,479
6 Claims. (Cl. 260—33.6)

This invention relates to the production of solutions of alpha-olefin containing polymers.

Copolymers containing alpha-olefin units and alpha, beta-ethylenically unsaturated carboxylic acid halide units, such as ethylene methacrylyl chloride copolymers are disclosed and claimed in U.S. patent application Ser. No. 254,567. The method of preparing these copolymers as described in the aforementioned patent application is copolymerization of the alpha-olefin and an alpha, beta-ethylenically unsaturated carboxylic acid. This copolymer is then treated with a halogenating agent such as carbonyl chloride, and the acid —OH group is replaced with a halogen atom. Solutions of copolymers having alpha-olefin units and acid halide units are useful to coat fabrics, leather, films and the like.

Under certain circumstances, it has been found very difficult to dissolve the copolymers disclosed in application Ser. No. 254,567 to form the copolymer solutions. Although the exact reason for the difficulty is not fully understood, it is believed that the copolymers form crosslinks. Even those copolymers that infra-red techniques show to have been fully converted from

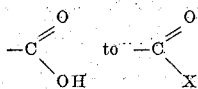

where X is a halide, become insoluble with time. Presumably, stray moisture causes hydrolysis and formation of anhydride crosslinks. This anhydride crosslink renders the copolymers very difficult to dissolve. The extent of the crosslinking reaction depends upon the number of acid groups that are present in the copolymer, and also upon the treatment of the copolymer after its formation; for example, if the copolymer is heated to above about 100° C., crosslinks tend to form rapidly.

The above difficulties are overcome by forming a mixture of the polymer and at least one strongly acidic compound. The mixture may be formed by adding the strongly acidic compound to the precursor of the polymer, i.e., the polymer of alpha-olefin and alpha, beta-ethylenically unsaturated carboxylic acid prior to its conversion to the halide, by adding a strongly acidic compound to the acid halide copolymer after its formation, or by adding a strongly acidic compound to the organic solvent which is to be used to dissolve the acid halide containing polymer.

The alpha-olefine/acid halide polymer to which it is desirable to add strongly acidic compounds and thus increase their solubility, are polymers having alpha-olefin units of the formula

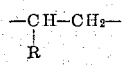

where R is a radical selected from the class consisting of hydrogen and alkyl groups having 1 to 8 carbon atoms, and acid halide units of the formula

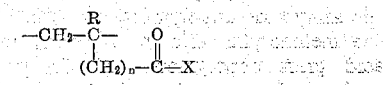

where $n$ is 0 to 4 and X is halogen, where R is hydrogen or alkyl having 0 to 5 carbon atoms. Preferably, the acid halide units have 3 to 8 carbon atoms. Thus, suitable alpha-olefin units are produced by copolymerizing such olefins as ethylene, propylene, butene-1, pentene-1, hexene-1, heptene-1, 3 methyl pentene-1, 4 methyl pentene-1, and the like, with suitable monomers, such as acrylic acid, methacrylic acid, ethacrylic acid, itaconic acid, maleic acid, fumaric acid, monoesters of dicarboxylic acids, such as methyl hydrogen maleate, methyl hydrogen fumarate, and ethyl hydrogen fumarate, or maleic anhydride and then halogenating the acid groups. The concentration of the acid monomer units in the copolymer should be from 0.1 mol percent to 25 mol percent, and preferably from 0.2 to 20 mol percent. The halogenation reaction may be carried out under such conditions that all the acid groups are replaced with halogen groups, but conversion of acid to halogen groups may be as low as .2 percent by weight of the polymer, and still yield a product useful for many coating and adhesive purposes. The molecular weight of the acid copolymer should be such that the melt index as measured by ASTM D–1238–57T is within the range of .1 to 2000 grams/10 minutes.

The alpha-olefin/alpha, beta-ethylenically unsaturated carboxylic acid copolymers employed in forming the acid halide copolymers may be prepared in several ways. Thus, the copolymers may be obtained by the copolymerization of a mixture of the olefin and the carboxylic acid monomer. This method is preferred for the copolymers of ethylene employed in the present invention. Methods employed for the preparation of ethylene/carboxylic acid copolymers have been described in the literature, for example U.S. Patent No. 2,646,425, issued July 21, 1953, to Barry. In a preferred process, a mixture of the two monomers is introduced into a polymerization environment maintained at high pressures, 50 to 3000 atmospheres, and elevated temperatures, 150 to 300° C., together with a free radical polymerization initiator such as a peroxide. An inert solvent for the system, such as water or benzene, may be employed, or the polymerization may be substantially a bulk polymerization.

The copolymers may also be obtained by the grafting of the acid comonomer to a polyolefin. Such graft copolymers are generally obtained by exposing a solution or finely divided powder of the polyolefin to ionizing radiation in the presence of the carboxylic acid comonomer. In another method, the polyolefin in solution or in a finely divided form is contacted with a solution of the acid and a peroxide. Graft copolymerization has been described in great detail in the literature and is for that reason not further detailed. Copolymers of alpha-olefins with carboxylic acids may also be prepared by copolymerization of the olefin with an alpha, beta-ethylenically unsaturated carboxylic acid derivative which subsequently or during copolymerization is reacted either completely or in part to form the free acid. Thus, hydrolysis, saponification or pyrolysis may be employed to form an acid copolymer from an ester copolymer.

The copolymer need not necessarily comprise a two component polymer. Thus, although the olefin content of the copolymer should be at least 50 mol percent, more than one olefin can be employed to provide the hydrocarbon nature of the copolymer base. Suitable copolymers include the following:

Ethylene/acrylic acid copolymers,
ethylene/methacrylic acid copolymers,
ethylene/itaconic acid copolymers,
ethylene/methyl hydrogen maleate copolymers,
ethylene/maleic acid copolymers,
ethylene/acrylic acid/methyl methacrylate copolymers,
ethylene/methacrylic acid/ethyl acrylate copolymers,
ethylene/itaconic acid/methyl methacrylate copolymers,
ethylene/methyl hydrogen maleate/ethyl acrylate, copolymers,
ethylene/methacrylic acid/vinyl acetate copolymers, ethylene/acrylic acid/vinyl alcohol copolymers,
ethylene/propylene/acrylic acid copolymers,
ethylene/styrene/acrylic acid copolymers,
ethylene/methacrylic acid/acrylonitrile copolymers,
ethylene/fumaric acid/vinyl methyl ether copolymers,
ethylene/vinyl chloride/acrylic acid copolymers,
ethylene/vinylidene chloride/acrylic acid copolymers,
ethylene/vinyl fluoride/methacrylic acid copolymers,
ethylene/methacrylic acid/acrylic acid copolymers,
ethylene/methacrylic acid/maleic anhydride copolymers,
ethylene/chlorotrifluoroethylene/methacrylic acid copolymers,
polyethylene/acrylic acid graft copolymers,
polyethylene/methacrylic acid graft copolymers,
polymerized ethylene/propylene acrylic acid graft copolymers,
polymerized ethylene/butene-1 methacrylic acid graft copolymers,
polymerized ethylene/vinyl acetate methacrylic acid graft copolymers,
polypropylene/acrylic acid graft copolymers,
polypropylene/methacrylic acid graft copolymers,
polybutene/acrylic acid graft copolymers,
poly-3-methylbutene/acrylic acid graft copolymers and
polyethylene/acrylic acid/ethyl acrylate graft copolymers.

The acid halide copolymers are obtained from the acid containing copolymer by treating with a suitable halogenating agent. Such agents include carbonyl chloride, thionyl chloride, phosphorus trichloride, and phosphorus pentachloride and the equivalent bromine and fluorine compounds. The halogen substitution step is usually carried out in an organic solvent for the copolymer, preferably a halogenated solvent. The solvent should be liquid under reaction conditions, and contain between 1 and 12 carbon atoms. Suitable solvents are carbon tetrachloride, perchloroethylene, trichloroethylene. The reaction may also be carried out in the absence of solvent using solid polymer and thionyl chloride vapor as the halogenating agent.

If the strongly acidic compound is added to the precursor of the acid halide containing polymer, or blended with the acid halide containing polymer prior to dissolving the polymer, then it is desirable that the compound be relatively non-volatile at room temperature and atmospheric pressure. If the compound is not added until the polymer is to be dissolved, then it may be volatile at room temperature and atmospheric pressure. Preferably, the compound should have a dissociation constant of at least $1 \times 10^{-5}$. Specific compounds include: hydrochloric acid, hydrogen chloride gas, phosphorus pentachloride, phosphorus oxychloride, phosphorus trichloride, acetyl chloride, propionyl chloride, octanoyl chloride, thionyl chloride, p-toluene sulfonyl chloride, benzene sulfonyl chloride, methane sulfonic acid, ethane sulfonic acid, p-toluene sulfonic acid, ortho-phosphoric acid, ortho-phosphorous acid, hydrogen fluoride, hydrogen bromide, sulfurous acid, phosphorous acid, perchloric acid. Mixtures of these compounds may also be employed.

Suitable solvents for dissolving the copolymers include hydrocarbons and chlorinated hydrocarbons, preferably having 1 to 12 carbon atoms. The solvents may be aromatic or aliphatic. Specifically, xylene, benzene, toluene, cyclohexane, hexane, ethylene, chlorobenzene, carbon tetrachloroethylene, carbon tetrachloride, andy trichlorethylene are suitable. Mixtures of these solvents may also be used. Other organic solvents may be employed.

In the following examples which illustrate the invention, all parts and percentages are in parts by weight unless otherwise specified.

Example I 100 grams (cubes) of ethylene-methacrylic acid polymer (9½) were packed in a ¾" x 24" distilling column fitted with an electrically heated jacket. The column was connected to a round bottom flask and through a distilling head to a vacuum and trap system. The round bottom flask contained 200 cc. of $SOCl_2$. The pressure was lowered to 370 mm. until the $SOCl_2$ in the flask boiled. The heat and pressure were varied to give a head temperature of 45–50° C. The column temperature was maintained at 50° C. Thionyl chloride vapor was in contact with copolymer cubes for 2½ hours. The column was then drained and full vacuum applied with a small $N_2$ bleed into the pot to remove excess $SOCl_2$. The vacuum was maintained for 4 hours. The polymer contained some $SOCl_2$. Infra-red scan indicated complete conversion of acid to acid chloride.

The polymer was dissolved in toluene and precipitated in acetone to remove the $SOCl_2$. After drying, the polymer would not dissolve in toluene even at reflux (110° C.). The polymer readily dissolved upon addition of .05 g. of p-toluene sulfonic acid.

Example II 100 grams (⅛ in cubes) of ethylene-methacrylic acid copolymers (9½) containing 0.5% of p-toluene sulfonic acid were packed in a ¾" x 24" distilling column fitted with an electrically heated jacket. The column was connected to a round bottom flask and through a distilling head to a vacuum and trap system. The pressure was lowered to 370 mm. until the $SOCl_2$ in the flask boiled. The heat and pressure were varied to give a temperature of 45–50° C. The column temperature was maintained at 50° C. Thionyl chloride vapor was in contact with copolymer cubes for 2½ hours. The column was then drained and full vacuum applied with a small $N_2$ bleed into the pot to sweep out excess $SOCl_2$. The vacuum was maintained for 4 hours. After removal of $SOCl_2$, polymer readily dissolved in toluene at 60–70° C.

Example III

An ethylene-methacrylic acid-methacrylyl chloride copolymer was obtained by the process of Example II, except that no acid was added to the polymer prior to conversion of some of the acid to acid chloride. The product was insoluble in xylene at 60° C., however, when the product was blended with 5% by weight p-toluene sulfonic acid and then placed in xylene, it readily dissolved.

As illustrated in the examples, the preferred concentration of acidic compound is 0.05 to 5% by weight of the copolymer; however, the concentration is not critical.

I claim:
1. A process for the preparation of solutions of polymers selected from the class consisting of ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/methacrylic acid/acrylic acid copolymers, ethylene/methacrylic acid/maleic anhydride copolymers, ethylene/chlorotrifluoroethylene/methacrylic acid copolymers, polyethylene/acrylic acid graft copolymers, polyethylene/methacrylic acid graft copolymers, polymerized ethylene/propylene acrylic acid graft copolymers, polymerized ethylene/butene-1 methacrylic acid graft copolymers, polymerized ethylene/vinyl acetate methacrylic acid graft copolymers, polypropylene/acrylic acid graft copolymers, polypropylene/ methacrylic acid graft copolymers, polybutene/acrylic acid graft copolymers, poly-3-methylbutene/acrylic acid graft copolymers and polyethylene/acrylic acid/ethyl acrylate graft copolymers, in which the alpha olefin units are present to the extent of at least 50 mol percent based on the total mols of units polymerized to form the polymer, and the acid monomer unit is present in the copolymer to the extent of 0.1 mol percent to 25 mol percent having a melt index within the range of 0.1 to 2000 g./10 min., which have been halogenated with a member selected from the class consisting of chlorine, fluorine and bromine, by the conversion of the acid groups to acid halide groups to the extent that the halogen groups form at least 0.2% by weight of the polymer, which comprises contacting said polymer with a solvent having 1 to 12 carbon atoms selected from the class consisting of hydrocarbons and chlorinated hydrocarbons in the presence of an acidic compound selected from the class consisting of hydrochloric acid, hydrogen chloride gas, phosphorus pentachloride, phosphorus oxychloride, phosphorus trichloride, acetyl chloride, propionyl chloride, octanoyl chloride, thionyl chloride, p-toluene sulfonyl chloride, benzene sulfonyl chloride, methane sulfonic acid, ethane sulfonic acid, p-toluene sulfonic acid, ortho-phosphoric acid, ortho-phosphorous acid, hydrogen fluoride, hydrogen bromide, sulfurous acid, phosphorous acid, perchloric acid, and mixtures thereof.

2. A process for the production of soluble polymers which comprises reacting a polymer selected from the class consisting of ethylene/acrylic acid copolymers, ethylene/methacrylic acid copolymers, ethylene/taconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/methacrylic acid/acrylic acid copolymers, ethylene/methacrylic acid/maleic anhydride copolymers, ethylene/chlorotrifluoroethylene/methacrylic acid copolymers, polyethylene/acrylic acid graft copolymers, polyethylene/methacrylic acid graft copolymers, polymerized ethylene/propylene acrylic acid graft copolymers, polymerized ethylene/butene-1 methacrylic acid graft copolymers, polymerized ethylene/vinyl acetate methacrylic acid graft copolymers, polypropylene/acrylic acid graft copolymers, polypropylene/methacrylic acid graft copolymers, polybutene/acrylic acid graft copolymers, poly-3-methylbutene/acrylic acid graft copolymers and polyethylene/acrylic acid/ethyl acrylate graft copolymers, in which the alpha olefin units are present to the extent of at least 50 mol percent based on the total mols of units polymerized to form the polymer, and the acid monomer unit is present in the copolymer to the extent of 0.1 mol percent to 25 mol percent having a melt index within the range of 0.1 to 2000 g./10 min., with a compound containing a halogen selected from the class consisting of chlorine, fluorine, and bromine, under conditions such that some of the acid OH groups are replaced with halogen groups, said reaction taking place in the presence of an acidic compound selected from the class consisting of hydrochloric acid, hydrogen chloride gas, phosphorus pentachloride, phosphorus oxychloride, phosphorus trichloride, acetyl chloride, propionyl chloride, octanoyl chloride, thionyl chloride, p-toluene sulfonyl chloride, benzene sulfonyl chloride, methane sulfonic acid, ethane sulfonic acid, p-toluene sulfonic acid, ortho-phosphoric acid, ortho-phosphorous acid, hydrogen fluoride, hydrogen bromide, sulfurous acid, phosphorous acid, perchloric acid, and mixtures thereof.

3. A polymer solution comprising polymers selected from the class consisting of ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/methacrylic acid/acrylic acid copolymers, ethylene/methacrylic acid/maleic anhydride copolymers, ethylene/chlorotrifluoroethylene/methacrylic acid copolymers, polyethylene/acrylic acid graft copolymers, polyethylene/methacrylic acid graft copolymers, polymerized ethylene/propylene acrylic acid graft copolymers, polymerized ethylene/butene-1 methacrylic acid graft copolymers, polymerized ethylene/vinyl acetate methacrylic acid graft copolymers, polypropylene/acrylic acid graft copolymers, polypropylene/methacrylic acid graft copolymers, polybutene/acrylic acid graft copolymers, poly-3-methylbutene/acrylic acid graft copolymers and polyethylene/acrylic acid/ethyl acrylate graft copolymers, in which the alpha olefin units are present to the extent of at least 50 mol percent based on the total mols of units polymerized to form the polymer, and the acid monomer unit is present in the copolymer to the extent of 0.1 mol percent to 25 mol percent having a melt index within the range of 0.1 to 2000 g./10 min., which have been halogenated with a member selected from the class consisting of chlorine, fluorine and bromine, by the conversion of the acid groups to acid halide groups to the extent that the halogen groups form at least 0.2% by weight of the polymer, an acidic compound selected from the class consisting of hydrochloric acid, hydrogen chloride gas, phosphorus pentachloride, phosphorus oxychloride, phosphorus trichloride, acetyl chloride, propionyl chloride, octanoyl chloride, thionyl chloride, p-toluene sulfonryl chloride, benzene sulfonyl chloride, methane sulfonic acid, ethane sulfonic acid, p-toluene sulfonic acid, ortho-phosphoric acid, ortho-phosphorous acid, hydrogen fluoride, hydrogen bromide, sulfurous acid, phosphorous acid, perchloric acid, and mixtures thereof and an organic solvent.

4. The process of claim 2 in which the acidic compound is p-toluene sulfonic acid, and the polymer prior to halogenation contained methacrylic acid units and the halogen is chlorine.

5. The solution of claim 3 in which the polymer prior to halogenating was ethylene/methacrylic acid/vinyl acetate, and the acidic compound is p-toluene sulfonic acid.

6. A process for the preparation of solutions of polymers having alpha olefin units selected from the class consisting of ethylene, propylene, butene-1, pentene-1, hexene-1, heptene-1, 3 methyl pentene-1 and 4 methyl pentene-1, in which the alpha olefin units are present to the extent of at least 50 mol percent based on the total units polymerized to form the polymer, and alpha, beta-ethylenically unsaturated carboxylic acid units selected from the class consisting of acrylic acid, methacrylic acid, ethacrylic acid, itaconic acid, maleic acid, fumaric acid, methyl hydrogen maleate, methyl hydrogen fumarate, ethyl hydrogen fumarate and maleic anhydride in which the acid monomer units are present to the extent of 0.1 to 25 mol percent, any remaining units in said copolymer being selected from the class consisting of methyl methacrylate, ethyl acrylate, vinyl acetate, vinyl alcohol, styrene, acrylonitrile, vinyl methyl ether, vinyl chloride, vinylidene chloride, vinyl fluoride, and chlorotrifluoroethylene, which polymers have been halogenated with a member selected from the class consisting of chlorine, fluorine and bromine by conversion of the acid groups to acid halide groups to the extent that the halogen groups form at least 0.2% by weight of the polymer, which comprises contacting said polymer with a solvent having 1 to 12 carbon atoms selected from the class consisting of hydrocarbons and chlorinated hydrocarbons in the presence of an acidic compound selected from the class consisting of hydrochloric acid, hydrogen chloride gas, phosphorus pentachloride, phosphorus oxychloride, phosphorus trichloride, acetyl chloride, propionyl chloride, octanoyl chloride, thionyl chloride, p-toluene sulfonyl chloride, benzene sulfonyl chloride, methane sulfonic acid, ethane sulfonic acid, p-toluene sulfonic acid, ortho-phosphoric acid, ortho-phosphorous acid, hydrogen fluoride, hydrogen bromide, sulfurous acid, phosphorous acid, perchloric acid, and mixtures thereof.

References Cited by the Examiner
UNITED STATES PATENTS

| | | | |
|---|---|---|---|
| 2,440,090 | 4/1948 | Howk et al. | 260—88.1 |
| 2,646,425 | 7/1953 | Barry | 260—88.1 |
| 3,177,269 | 4/1965 | Nowak et al. | 260—878 |

MORRIS LIEBMAN, *Primary Examiner.*

L. T. JACOBS, *Assistant Examiner.*